March 30, 1937. W. SCHNEIDER 2,075,145
ANTIHALATION LAYER
Filed Dec. 1, 1932
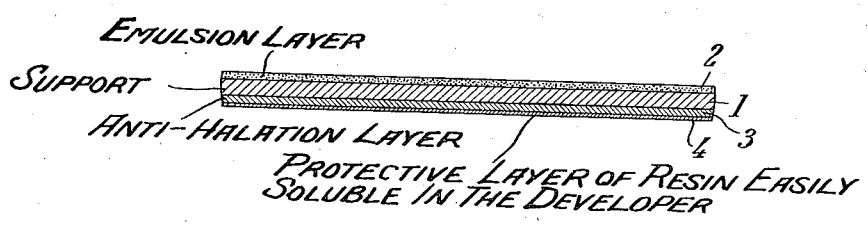
Inventor:
Wilhelm Schneider,
By Attorney
Philip S. Hopkins.

Patented Mar. 30, 1937

2,075,145

UNITED STATES PATENT OFFICE 2,075,145

ANTIHALATION LAYER

Wilhelm Schneider, Dessau in Anhalt, Germany, assignor to Agfa Ansco Corporation, Binghamton, N. Y., a corporation of New York Application December 1, 1932, Serial No. 645,310
In Germany December 15, 1931

5 Claims. (Cl. 95—8)

My present invention relates to anti-halation layers for photographic plates and films, and more particularly to an anti-halation layer applied on the rear side of such plates and films.

One of its objects is to provide a process of preventing particles to split from the colored layer by coating the said layer with a protecting layer of natural or artificial resin containing at least one hydroxyl group or carboxyl group capable of forming a salt. Another object is the plates and films provided with an improved anti-halation layer. Further objects will be seen from the detailed specification following hereafter.

In my co-pending application Serial Number 569,067 filed October 15, 1931, I have described a process of protecting an anti-halation layer applied on the rear side of a photographic plate or film by coating the anti-halation layer with a thin layer of a diarylmethane derivative containing at least one hydroxyl group or carboxyl group in its molecule.

According to my present invention I have found that most valuable protecting layers are obtainable by the application of natural or artificial resins containing in their molecule a hydroxyl group or a carboxyl group capable of forming a salt. These layers are soluble in alkaline baths such as the developers, feebly alkaline solutions being capable of dissolving the protecting layer if the resin contains a carboxyl group. Valuable products for the purpose in view are also obtained by treating natural resins with alkali and precipitating the said products by means of an acid.

As suitable artificial resins I enumerate, for instance, the condensation products of formaldehyde or a substance splitting off formaldehyde or phenolalcohol with a phenol, phenylalkylether, phenylarylether, oxycarboxylic acid, an alkyloxycarboxylic acid or phenoxy fatty acid, furthermore an artificial resin which has been treated with a halogenated fatty acid, or a product obtained by condensing a phenol or a phenolcarboxylic acid with an aliphatic, aromatic or heterocyclic aldehyde or with thionyl chloride. The formation of these products is known (cf. for instance DRP. 364,040; 371,148; 391,539; 439,962; 449,276; 363,383; 358,401; 357,757; 339,495; 357,758) and is not claimed in this invention. Natural resins which by a treatment with alkali become suitable for my invention are, for instance, shellac and colophony.

The protective coating is produced by applying to the anti-halation layer a non-aqueous solution of the resin and generally has a thickness of about 0.5 to 2μ. It completely protects the anti-halation layer from mechanical damage in the camera and from being impaired by the aqueous vapor contained in the air. Consequently, colored particles cannot stain the emulsion layer nor deposit in the exposure gate of the camera.

The following examples illustrate the invention:

Example 1.—A solution of 50 grams of ammonium polyglucuronate, 50 grams of methyl blue in 5000 cc. of water is applied on the back of an acetylcellulose or nitrocellulose film in a thickness of 1–2μ. After drying, the anti-halation layer thus obtained is coated with a solution of 250 grams of artificial resin, prepared from phenoxyacetic acid and formaldehyde, in 5000 cc. of alcohol. The coating dissolves even in very weak alkaline developers within about 10 to 20 seconds.

Example 2.—The same film provided with an anti-halation layer as in Example 1 is coated on its anti-halation layer with a solution of 200 grams of the condensation product of phenol and acetaldehyde in 5000 cc. of methanol.

Example 3.—An acetyl cellulose or nitrocellulose film is provided with an anti-halation layer by means of a solution of 50 grams of methyl blue in 2500 cc. of water and 2500 cc. of alcohol. After drying, the anti-halation layer is coated with a solution of 250 grams of colophony in 5000 cc. of butanol. The colophony was first dissolved in sodium carbonate and precipitated from this solution by addition of diluted hydrochlorid acid. The coating dissolves within a short time in strong alkaline developers.

Example 4.—To the same film as in Example 3 there is applied on the anti-halation layer a protective layer from a solution of 250 grams of the condensation product of ortho-methoxy-benzoic acid with p-cresol-di-alcohol in 5000 cc. of propanol.

My invention is not limited to the foregoing examples or to the specific details given therein. The solvent for the solutions of the resin and its concentration are adapted to the requirements and can be easily determined by a few simple experiments. The hydroxyl group or carboxyl group can be positioned in the aliphatic radical or in the aromatic radical of the resins. Numerous other embodiments are possible and I contemplate to be within the spirit of my invention all such modifications and equivalents as fall within the scope of the appended claims.

The annexed drawing illustrates my invention. The figure represents a sectional view of a photographic plate prepared according to my invention. In this figure, 1 is the glass plate which serves as support, 2 is the emulsion layer, 3 is the color layer forming the anti-halation layer on the back of the plate, and 4 is my new coating layer preventing particles of being split off from the colored layer.

What I claim is:

1. Photographic plates or films comprising a support bearing on one side a light-sensitive emulsion layer and on the other side a solid anti-halation layer coated with a protective layer containing a resin easily soluble in alkaline developers containing at least one radical capable of forming a salt selected from the group consisting of —OH and —COOH.

2. Photographic plates or films comprising a support, bearing on one side a light sensitive emulsion layer and on the other side an anti-halation layer coated with a protective layer containing an alkali-soluble formaldehyde-phenoxyacetic acid resin.

3. Photographic plates or films comprising a support, bearing on one side a light sensitive emulsion layer and on the other side an anti-halation layer coated with a protective layer containing an alkali-soluble phenol-acetaldehyde resin.

4. Photographic plates or films comprising a support, bearing on one side a light sensitive emulsion layer and on the other side an anti-halation layer coated with a protective layer containing alkali-treated colophony.

5. Photographic plates or films comprising a support, bearing on one side a light sensitive emulsion layer and on the other side a solid anti-halation layer coated with a protective layer containing an alkali-soluble resin selected from the group consisting of formaldehyde-oxyphenylcarboxylic acid resins, formaldehyde-alkoxyphenylcarboxylic acid resins, formaldehyde-aryloxyphenylcarboxylic acid resins, formaldehyde-phenoxy fatty acid resins, phenolalcohol-phenylalkyl ether resins, phenolalcohol-phenylaryl ether resins, phenol-alcohol-oxyphenylcarboxylic acid resins, phenolalcohol-alkoxyphenylcarboxylic acid resins, phenolalcohol-phenoxy fatty acid resins, phenol-aliphatic aldehyde resins, phenol-aromatic aldehyde resins, phenol-heterocyclic aldehyde resins, phenol-thionyl chloride resins, phenol-carboxylic acid-aromatic aldehyde resins, phenolcarboxylic acid-heterocyclic aldehyde resins and phenolcarboxylic acid-thionylchloride resins.

WILHELM SCHNEIDER.